United States Patent
You et al.

(10) Patent No.: US 11,919,976 B1
(45) Date of Patent: Mar. 5, 2024

(54) PREPARATION AND PURIFICATION METHOD FOR CATIONIC QUATERNARY AMMONIUM SALT OF SODIUM HYALURONATE IN HOMOGENEOUS MEDIUM

(71) Applicant: SHANDONG FOCUSFREDA BIOTECH CO., LTD, Shandong (CN)

(72) Inventors: Jinmao You, Shandong (CN); Lei Liu, Shandong (CN); Chuanli Kang, Shandong (CN); Shuiqiang Yu, Shandong (CN); Deqiang Zheng, Shandong (CN); Qing Li, Shandong (CN); Shuai Du, Shandong (CN); Xinxin Shi, Shandong (CN); Qiang Liu, Shandong (CN); Liwei Tang, Shandong (CN); Shaojie Lian, Shandong (CN); Meixia Zhang, Shandong (CN)

(73) Assignee: SHANDONG FOCUSFREDA BIOTECH CO., LTD, Shandong (CN)

(*) Notice: Subject to any disclaimer, the term of this patent is extended or adjusted under 35 U.S.C. 154(b) by 0 days.

(21) Appl. No.: 18/299,008

(22) Filed: Apr. 11, 2023

(30) Foreign Application Priority Data

Nov. 18, 2022 (CN) .......................... 202211446277.8

(51) Int. Cl.
C08B 37/08 (2006.01)
(52) U.S. Cl.
CPC ............................. C08B 37/0072 (2013.01)
(58) Field of Classification Search
CPC .................................................. C08B 37/0072
See application file for complete search history.

(56) References Cited

U.S. PATENT DOCUMENTS 8,410,076 B2 * 4/2013 Asaoka .................... A61Q 5/12
536/18.7

FOREIGN PATENT DOCUMENTS

| CN | 101316864 | | 12/2008 | | |
|----|-----------|---|---------|---|---|
| CN | 101715457 | | 5/2010 | | |
| CN | 111560086 | | 8/2020 | | |
| CN | 112190502 | A * | 1/2021 | ............. | A61K 8/416 |

OTHER PUBLICATIONS

Glycidyl trimethylammonium chloride [MAK Value Documentation, 1992]. In The MAK-Collection for Occupational Health and Safety (2012). (Year: 2012).*
Tan, J. et al, Glucosyloxymethylfurfural (GMF): a creative renewable scaffold towards bioinspired architectures. Pure Appl. Chem. 2015; 87(8): 827-839 (Year: 2015).*
Zhu et al, CN 111560086. English Translation. 2022 (Year: 2022).*
Chen et al, CN-112190502. English Translation. 2021 (Year: 2021).*

* cited by examiner

*Primary Examiner* — Eric Olson
*Assistant Examiner* — Samuel L Galster
(74) *Attorney, Agent, or Firm* — JCIPRNET

(57) ABSTRACT

The present invention relates to a preparation and purification method for cationic quaternary ammonium salt of sodium hyaluronate in homogeneous medium. By adding a homogeneous solvent and a sodium hyaluronate solid to a vessel, heating the vessel until the contents are dissolved to form a homogeneous system, adding an aqueous solution of 2,3-epoxypropyltrimethylammonium chloride (GTA) to the homogeneous system, then adding a base catalyst, and stirring at a preset temperature to carry out a graft reaction, a graft product is obtained wherein 2,3-epoxypropyltrimethylammonium chloride is grafted to the oxygen atom of the hydroxymethyl group of sodium hyaluronate. By using the method, a graft product wherein 2,3-epoxypropyltrimethylammonium chloride is grafted to the oxygen atom of the hydroxymethyl group of sodium hyaluronate is obtained. Addition of salts is avoided during the reaction, a grafting yield up to 0.69 is obtained, and coagulation occurred to the product is effectively solved.

8 Claims, No Drawings

PREPARATION AND PURIFICATION METHOD FOR CATIONIC QUATERNARY AMMONIUM SALT OF SODIUM HYALURONATE IN HOMOGENEOUS MEDIUM

CROSS-REFERENCE TO RELATED APPLICATION

This application claims the priority benefit of China application serial no. 202211446277.8, filed on Nov. 18, 2022. The entirety of the above-mentioned patent application is hereby incorporated by reference herein and made a part of this specification.

BACKGROUND OF THE INVENTION

1. Technical Field

The present invention relates to the technical field of production technology of cationic hyaluronates, and particularly relates to a preparation and purification method for cationic quaternary ammonium salt of sodium hyaluronate in homogeneous medium.

2. Background Art

With good disinfection and sterilization, corrosion resistance, antistatic properties, and emulsification and wetting properties, cationic surfactants can be used for medical disinfection and sterilization, and can also be used as waterproof agents. Thus, they are widely used in medicine, energy, chemical, food, detergent, printing and other industries. Although the quaternary ammonium salts are poor in washing ability, they still account for a large proportion among the cationic surfactants, with the largest output and wide use due to their strong disinfection and sterilization ability.

As sodium hyaluronate has carboxyl group with negative charge while human body surface is negatively charged, the absorption effect of hyaluronic acid products on human body surface is generally poor, which tends to be washed away by water, thereby affecting the moisturizing effect of products. If hyaluronic acid carries cation, it will greatly improve the adhesion of the product on the skin surface and improve the shortcoming of poor moisturizing performance of hyaluronic acid, so as to develop a skin care and beauty product with high moisturizing efficiency and easy absorption on the skin surface. The synthesis of cationic sodium hyaluronate can greatly improve the emulsification and wetting properties of sodium hyaluronate, and will be well applied in many fields such as medicine, beauty and cosmetics.

In the existing technologies, most of the patents adopt a reaction of hyaluronic acid (salt) in water/ethanol and a mixed solution thereof. Among the methods for preparing cationic sodium hyaluronate, they all adopt a reaction of hyaluronic acid (salt) with a cationization reagent in a mixed liquid of water and an organic solvent as a medium. For example, patent CN111560086A is a semidry method for preparing cationic hyaluronates, wherein a grafting yield is uneven during the process of using the semidry method for preparing cationic sodium hyaluronate, since the molecules inside the solid particles fail to be effectively cationic grafted. In patent CN101316864A, cationic sodium hyaluronate is prepared in a solvent where sodium hyaluronate and water coexist. However, the conversion rate is low and it requires a long reaction time to obtain a target product due to poor solubility of the raw material. Other patents adopt a mixed solvent of water and ethanol. In order to enhance the solubility of sodium hyaluronate in an alcohol/water system, a large amount of edible salts are added to the system to increase an ionic strength, which results in tedious procedure for removing the salts and problems brought to the post-treatment, and also unwanted pollution to the environment. In the preparation method for cationic hyaluronic acid or salt thereof in CN101715457A, a heterogeneous reaction is adopted during the ionization. Not only the cationization yield is low, but also the ionization is uneven. In order to increase the solubility of hyaluronic acid in the solution, a large amount of sodium chloride solution is added during the reaction (generally, an addition amount of the required salt is 1-5%) to enhance the ionic strength of the system, and thus the solubility of hyaluronic acid in the system is increased. However, the precipitated product tends to contain a large amount of salts, resulting in increasing times of washing and lots of waste water discharged. Besides, sodium hyaluronate in the heterogeneous medium tends to coagulate, and coagulation will be brought into the use of the sodium hyaluronate containing coagulated salts when applied to the hair improver, cuticle repair agent, skin improver and cosmetics, thus affecting the application of product. Moreover, the addition of salt solution brings great problem to the post-treatment of recovering solvent, not only taking time and effort, but also causing waste of resources and pollution to the environment. In addition, reaction of sodium hyaluronate and the cationization reagent in such scheme occurs at the carboxyl site. Degree of substitution of cationic sodium hyaluronate is evaluated through moles of the active carboxyl groups that are substituted on per mole monomer. It can be seen that a theoretically maximum degree of substitution is 1. With the increasing degree of substitution, both viscosity and transparency of the reaction liquid are enhanced. The addition of alkali can accelerate breakage of the cationic etherification agent in the initial stage, promoting to react with sodium hyaluronate; in the later stage, the alkali leads to the breakage of molecular chain of cationic sodium hyaluronate and thereby inhibiting the reaction process. The longer the molecular chain of sodium hyaluronate, the more difficult the substitution of reaction. When the degree of substitution continues to increase, water solubility of the cationic sodium hyaluronate becomes better, resulting in greater swelling in water and wider range for the molecules to stretch, which, to some extent, would lead to a balanced trend between a cationization degree and a yield of the cationic sodium hyaluronate.

SUMMARY OF THE INVENTION

With respect to the above-mentioned issues among the existing technologies, the present invention provides a preparation and purification method for cationic quaternary ammonium salt of sodium hyaluronate in homogeneous medium to obtain a graft product wherein 2,3-epoxypropyltrimethylammonium chloride is grafted to the oxygen atom of the hydroxymethyl group of sodium hyaluronate. Addition of salts is avoided during the reaction, a grafting yield up to 0.69 is obtained, and coagulation occurred to the product is effectively solved.

The technical solution of the present invention solving the above-mentioned technical problems is as follows:

in one aspect, a preparation and purification method for cationic quaternary ammonium salt of sodium hyaluronate in homogeneous medium is provided, including the following steps:

adding a homogeneous solvent and a sodium hyaluronate (HA) solid to a vessel, wherein the sodium hyaluronate used is sodium hyaluronate with high molecular weight, being 1 million-1.2 million Dal, heating the vessel until the contents are dissolved to form a homogeneous system, adding an aqueous solution of 2,3-epoxypropyltrimethylammonium chloride (glycidyl trimethyl ammonium chloride, GTA) to the homogeneous system, then adding a base catalyst, and stirring at a preset temperature to carry out a graft reaction for obtaining a graft product wherein 2,3-epoxypropyltrimethylammonium chloride is grafted to the oxygen atom of the alkane hydroxyl group of sodium hyaluronate. No salts are added during the graft reaction, and a synthetic route is as follows:

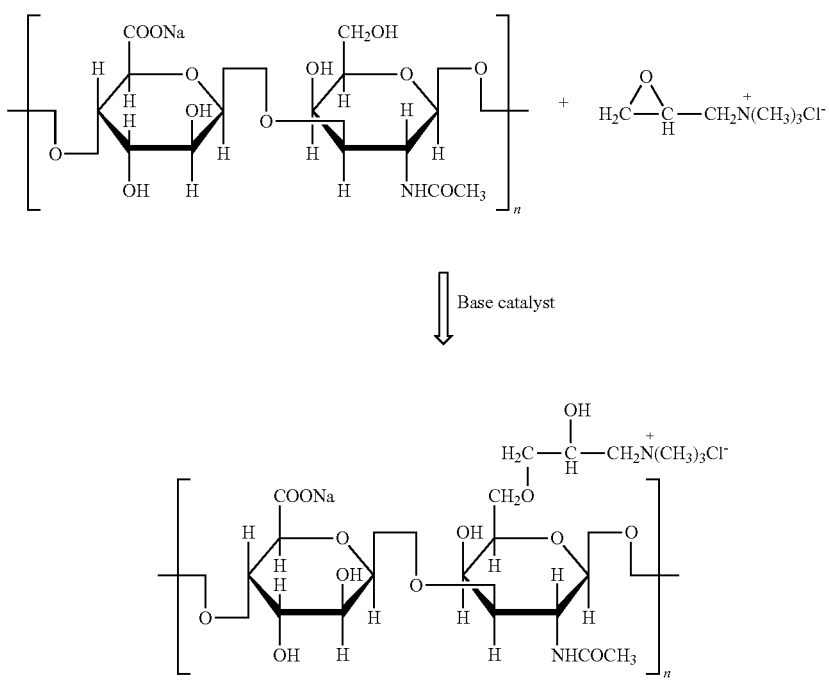

Further, the homogeneous solvent is at least one of HMF, DMF, ethanol, methanol, acetic acid, DMSO, or is an aqueous mixture of at least one of HMF, DMF, ethanol, methanol, acetic acid, DMSO.

Furthermore, the homogeneous solvent is a mixture of HMF and H2O (HMF-H2O). Preferably, a volume fraction of HMF in the HMF-H2O is 50% to 80% relative to a volume fraction of $H_2O$ (HMF/$H_2O$, v/v).

Further, a molar ratio of the sodium hyaluronate solid to 2,3-epoxypropyltrimethylammonium chloride is 1:(0.5-10), preferably 1:2.

Further, the preset temperature is 40-80° C., and the graft reaction lasts for at least 1 h.

Further, the base catalyst is at least one of NaOH, KOH, $Na_2CO_3$, $K_2CO_3$, $CH_3COONa$, $CH_3COOK$, $KHCO_3$, $NaHCO_3$. A molar ratio of the added base catalyst to the HA ranges from 0.2 to 1.0, preferably the molar ratio is 1:1, and within this range, a cationization degree is relatively high. If the base catalyst is added in an excess amount, side reaction would be resulted more likely.

Further, the preparation and purification method for cationic quaternary ammonium salt of sodium hyaluronate in homogeneous medium also includes the following steps:

after the graft reaction, subjecting the reaction system to alcohol precipitation to obtain a mixed solution A containing a first precipitate, separating the first precipitate, and sufficiently dissolving the first precipitate with water to obtain a feed liquid;

adding a 1-5% refined salt solution of NaCl or KCl (as a swelling-inhibitor) to the feed liquid, stirring to allow sufficient dissolution, and adjusting a pH value of the feed liquid to 6.0-7.5; the salt added during this step can all be washed away by the subsequent washing, so as to allow the product to be free of salt;

carrying out a second alcohol precipitation, separating a second precipitate, dissolving the second precipitate with water, and then carrying out alcohol precipitation again to obtain a third precipitate; and washing the third precipitate with alcohol, dewatering, and drying to obtain a final product.

Furthermore, during the alcohol precipitation, a volume ratio of the feed liquid to ethanol is 1:(1-10); when water is added to dissolve the first precipitate, a mass-volume ratio of the first precipitate to water is 1:(5-50).

In the other aspect, a cationic quaternary ammonium salt of sodium hyaluronate provided by the present invention, and prepared by the preparation and purification method according to the above, having a structural formula shown as follows:

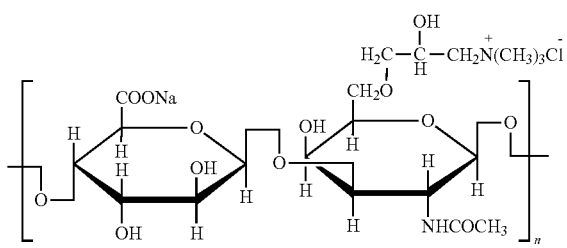

The present invention has the following beneficial effects:

1. By the chemical modification to HA molecules in the homogeneous medium, the present invention allows quaternary ammonium group having positive charge to be grafted to the oxygen atom of the hydroxymethyl group of sodium hyaluronate, such that the entire molecule has a certain positive electricity. Due to the inter-attraction between the positive charges and negative charges, the modified quaternary ammonium salt derivative of sodium hyaluronate can be well adsorbed to hair and surface of skin, and have good wettability and moisture retention. Meanwhile, since the hydrophilic trimethylammonium chloride group on the quaternary ammonium salt group has strong hydrophilicity, the sodium hyaluronate molecule grafted with quaternary ammonium salt group shows significant molecular property and plays a role of unique wettability and moisture retention in hair products and cleaning products.

2. Through the homogeneous reaction, product prepared by the present invention obtains a relatively high grafting yield, without adding salt or with little salt. Meanwhile, the existing salt in the present solution can be washed away by water such that coagulation of sodium hyaluronate is effectively reduced. The preparation method is simple and with strong operability, the addition of salt in large amount during the cationization process is avoided, and the purification of product is simple for large-scale production.

3. The specific homogeneous solvent HMF-H$_2$O is used by the present invention as a solvent for the graft reaction of HA and GTA, and particularly, a volume fraction of HMF in the homogeneous system accounts for 50%-80% (HMF/H$_2$O, v/v), and a homogeneous system is formed. It is surprisingly found by the inventors that in such solvent system, a grafting yield of cationization thereof is significantly improved compared to that in solvents such as other alcohols or DMF, DMSO.

DETAILED DESCRIPTION OF THE EMBODIMENTS

The principles and characteristics of the present invention are described in the following with examples which are used to interpret the present invention and are not intended to limit the scope of protection.

Example 1

A preparation and purification method for cationic quaternary ammonium salt of sodium hyaluronate in homogeneous medium of the present example includes the following steps:

1000 mL HMF aqueous solution having a volume content of 50% was added to a three-neck flask equipped with a stirrer and a reflux condenser, the solution was preheated with stirring to 65° C. in water bath. 50 g sodium hyaluronate solid powder having a molecular weight of 1.36 MDa was weighed and added slowly with stirring to the preheated solution. Then, 0.42 g sodium hydroxide and a solution of 40 g 2,3-epoxypropyltrimethylammonium chloride (GTA) being dissolved in 200 mL water were successively added (a molar ratio of HA/GTA is 1:2) to the flask, and a reaction mixture in the flask was subjected to a reaction with stirring in a 65° C. water bath for 4.0 h. 2000 mL 90% ethanol was added for precipitation to form a first solid precipitate. The first solid precipitate was collected after filtration, and was sufficiently dissolved via stirring after adding deionized water. A dissolved feed liquid was obtained and 2% refined NaCl solution was added thereto, pH value of the feed liquid was adjusted to 6.8 by adding a diluted hydrochloric acid solution, and 1 volume ethanol was added for precipitation to form a second precipitate. Supernatant alcohol was removed after standing the second precipitate for 0.5 h, then the second precipitate was dissolved again in the deionized water, and 1 volume ethanol was added again for a second precipitation to form a third precipitate.

Supernatant alcohol was removed after the second precipitation, and the third precipitate was washed by 60% ethanol. The washed precipitate was subjected to dewatering by using absolute ethanol, placed naturally for 1 h after dewatering, and then dried in a vacuum oven for 6 h to obtain a cationized product having a weight of 47.6 g.

Upon determination, a loss on drying of white solid powder is 3.68%, a grafting yield is 0.66, pH is 6.8, a protein residue was 0.04% and a residue on ignition is 3.2%.

Example 2

A preparation and purification method for cationic quaternary ammonium salt of sodium hyaluronate in homogeneous medium of the present example includes the following steps:

1000 mL HMF aqueous solution having a volume content of 80% was added to a three-neck flask equipped with a stirrer and a reflux condenser, the solution was preheated with stirring to 40° C. in water bath. 50 g sodium hyaluronate solid powder having a molecular weight of 1.36 MDa was weighed and added slowly with stirring to the preheated solution. Then, 0.42 g potassium hydroxide and a solution of 40 g 2,3-epoxypropyltrimethylammonium chloride (GTA) being dissolved in 200 mL water were successively added (a molar ratio of HA/GTA is 1:2) to the flask, and a reaction mixture in the flask was subjected to a reaction with stirring in a 40° C. water bath for 6.0 h. 2000 mL 90% ethanol was added for precipitation to form a first solid precipitate. The first solid precipitate was collected after filtration, and was sufficiently dissolved via stirring after adding deionized water. A dissolved feed liquid was obtained and 1% refined NaCl solution was added thereto, pH value of the feed liquid was adjusted to 6.0, and 1 volume ethanol was added for precipitation to form a second precipitate. Supernatant alcohol was removed after standing the second precipitate for 0.5 h, then the second precipitate was dissolved again in the deionized water, and 1 volume ethanol was added again for a second precipitation to form a third precipitate.

Supernatant alcohol was removed after the second precipitation, and the third precipitate was washed by 60% ethanol. The washed precipitate was subjected to dewatering by using absolute ethanol, placed naturally for 1 h after dewatering, and then dried in a vacuum oven for 6 h to obtain a cationized product having a weight of 47.9 g.

Upon determination, a loss on drying of white solid powder is 4.47%, a grafting yield is 0.69, pH is 6.8, a protein residue was 0.04% and a residue on ignition is 3.9%.

Example 3

A preparation and purification method for cationic quaternary ammonium salt of sodium hyaluronate in homogeneous medium of the present example includes the following steps:

1000 mL HMF aqueous solution having a volume content of 60% was added to a three-neck flask equipped with a stirrer and a reflux condenser, the solution was preheated with stirring to 80° C. in water bath. 50 g sodium hyaluronate solid powder having a molecular weight of 1.36 MDa was weighed and added slowly with stirring to the preheated solution. Then, 0.42 g sodium carbonate and a solution of 40 g 2,3-epoxypropyltrimethylammonium chloride (GTA) being dissolved in 200 mL water were successively added (a molar ratio of HA/GTA is 1:2) to the flask, and a reaction mixture in the flask was subjected to a reaction with stirring in a 80° C. water bath for 3.0 h. 2000 mL 90% ethanol was added for precipitation to form a first solid precipitate. The first solid precipitate was collected after filtration, and was sufficiently dissolved via stirring after adding deionized water. A dissolved feed liquid was obtained and 4% refined saline solution was added thereto, pH value of the feed liquid was adjusted to 6.5, and 1 volume ethanol was added for precipitation to form a second precipitate. Supernatant alcohol was removed after standing the second precipitate for 0.5 h, then the second precipitate was dissolved again in the deionized water, and 1 volume ethanol was added again for a second precipitation to form a third precipitate.

Supernatant alcohol was removed after the second precipitation, and the third precipitate was washed by 60% ethanol. The washed precipitate was subjected to dewatering by using absolute ethanol, placed naturally for 1 h after dewatering, and then dried in a vacuum oven for 6 h to obtain a cationized product having a weight of 47.2 g.

Upon determination, a loss on drying of white solid powder is 4.98%, a grafting yield is 0.63, pH is 6.8, a protein residue was 0.03% and a residue on ignition is 3.2%.

Example 4

A preparation and purification method for cationic quaternary ammonium salt of sodium hyaluronate in homogeneous medium of the present example includes the following steps:

1000 mL HMF aqueous solution having a volume content of 60% was added to a three-neck flask equipped with a stirrer and a reflux condenser, the solution was preheated with stirring to 80° C. in water bath. 50 g sodium hyaluronate solid powder having a molecular weight of 1.36 MDa was weighed and added slowly with stirring to the preheated solution. Then, 0.42 g potassium acetate and a solution of 40 g 2,3-epoxypropyltrimethylammonium chloride (GTA) being dissolved in 200 mL water were successively added (a molar ratio of HA/GTA is 1:2) to the flask, and a reaction mixture in the flask was subjected to a reaction with stirring in a 80° C. water bath for 1.2 h. 2000 mL 90% ethanol was added for precipitation to form a first solid precipitate. The first solid precipitate was collected after filtration, and was sufficiently dissolved via stirring after adding deionized water. A dissolved feed liquid was obtained and 5% refined saline solution was added thereto, pH value of the feed liquid was adjusted to 6.5, and 1 volume ethanol was added for precipitation to form a second precipitate. Supernatant alcohol was removed after standing the second precipitate for 0.5 h, then the second precipitate was dissolved again in the deionized water, and 1 volume ethanol was added again for a second precipitation to form a third precipitate.

Supernatant alcohol was removed after the second precipitation, and the third precipitate was washed by 60% ethanol. The washed precipitate was subjected to dewatering by using absolute ethanol, placed naturally for 1 h after dewatering, and then dried in a vacuum oven for 6 h to obtain a cationized product having a weight of 47.3 g.

Upon determination, a loss on drying of white solid powder is 4.57%, a grafting yield is 0.63, pH is 6.8, a protein residue was 0.03% and a residue on ignition is 3.3%.

Comparative Example 1

A preparation and purification method for cationic quaternary ammonium salt of sodium hyaluronate in homogeneous medium of the present comparative example was substantially the same as that of Example 1, with the differences that the solvent, i.e. the HMF aqueous solution, was replaced by a HMF aqueous solution having a volume content of 40%, and a weight of the obtained product was 44.0 g.

Upon determination, a loss on drying of white solid powder is 3.84%, a grafting yield is 0.35, pH is 6.7, a protein residue was 0.04% and a residue on ignition is 4.3%.

Comparative Example 2

A preparation and purification method for cationic quaternary ammonium salt of sodium hyaluronate in homogeneous medium of the present comparative example was substantially the same as that of Example 1, with the differences that the solvent, i.e. the HMF aqueous solution, was replaced by a HMF aqueous solution having a volume content of 90%, and a weight of the obtained product was 43.5 g.

Upon determination, a loss on drying of white solid powder is 3.93%, a grafting yield is 0.30, pH is 6.8, a protein residue was 0.04% and a residue on ignition is 2.7%.

Comparative Example 3

A preparation and purification method for cationic quaternary ammonium salt of sodium hyaluronate in homogeneous medium of the present comparative example was substantially the same as that of Example 1, with the differences that the solvent, i.e. the HMF aqueous solution, was replaced by a DMF aqueous solution, and a weight of the obtained product was 42.1 g.

Upon determination, a loss on drying of white solid powder is 5.67%, a grafting yield is 0.18, pH is 6.8, a protein residue was 0.02% and a residue on ignition is 2.3%.

Comparative Example 4

A preparation and purification method for cationic quaternary ammonium salt of sodium hyaluronate in homogeneous medium of the present comparative example was substantially the same as that of Example 1, with the differences that the solvent, i.e. the HMF aqueous solution, was replaced by DMSO, and a weight of the obtained product was 43.1 g.

Upon determination, a loss on drying of white solid powder is 6.78%, a grafting yield is 0.27, pH is 6.9, a protein residue was 0.02% and a residue on ignition is 2.4%.

Comparative Example 5

A preparation and purification method for cationic quaternary ammonium salt of sodium hyaluronate in homogeneous medium of the present comparative example was substantially the same as that of Example 1, with the differences that the solvent, i.e. the HMF aqueous solution, was replaced by ethanol (a heterogeneous system), and a weight of the obtained product was 42.6 g.

Upon determination, a loss on drying of white solid powder is 4.26%, a grafting yield is 0.22, pH is 6.8, a protein residue was 0.02% and a residue on ignition is 3.1%.

Comparative Example 6

A preparation and purification method for cationic quaternary ammonium salt of sodium hyaluronate in homogeneous medium of the present comparative example was substantially the same as that of Example 1, with the differences that a molar ratio of HA to GTA was 1:0.5, and a weight of the obtained product was 43.87 g.

Upon determination, a loss on drying of white solid powder is 4.13%, a grafting yield is 0.34, pH is 6.8, a protein residue was 0.04% and a residue on ignition is 2.7%.

Comparative Example 7

A preparation and purification method for cationic quaternary ammonium salt of sodium hyaluronate in homogeneous medium of the present comparative example was substantially the same as that of Example 1, with the differences that a molar ratio of HA to GTA was 1:0.2, and a weight of the obtained product was 40.9 g.

Upon determination, a loss on drying of white solid powder is 4.56%, a grafting yield is 0.08, pH is 6.8, a protein residue was 0.03% and a residue on ignition is 2.9%.

Cationization of quaternary ammonium hyaluronate prepared by the method of the present invention includes mainly grafting 2,3-epoxypropyltrimethylammonium chloride to the oxygen atom of the hydroxymethyl group of the sodium hyaluronate molecule. A grafting yield (degree of substitution) was determined by purifying the cationic hyaluronate product via methanol Soxhlet extraction and calculating a nitrogen content of the cationic hyaluronate according to the Kjeldah method. The degree of substitution (DS) was calculated through the nitrogen content:

$$DS = \frac{M_S \times (W_1 - W_0)}{1400 - M_{GTA} \times (W_1 - W_0)}.$$

In the above formula, $W_1$ represents a determined percentage content of nitrogen in the cationic quaternary ammonium hyaluronate (determined by the Kjeldah method); $W_0$ represents a percentage content of nitrogen in the raw hyaluronate (determined by the Kjeldah method); $M_S$ represents the molar molecular weight of the sodium hyaluronate unit, i.e. 379 g/mol; $M_{GTA}$ represents the relative molecular weight of GTA, i.e. 151.6 g/mol; 1400 is a value of relative molecular weight of nitrogen atom after unit conversion.

The grafting yield data of the examples and comparative examples are shown in Table 1.

TABLE 1

| Example | Grafting yield (degree of substitution) |
|---|---|
| Example 1 | 0.66 |
| Example 2 | 0.69 |
| Example 3 | 0.63 |
| Example 4 | 0.63 |
| Comparative Example 1 | 0.35 |
| Comparative Example 2 | 0.30 |
| Comparative Example 3 | 0.18 |
| Comparative Example 4 | 0.27 |
| Comparative Example 5 | 0.22 |
| Comparative Example 6 | 0.34 |
| Comparative Example 7 | 0.08 |

It can be known from the above data of the examples and comparative examples that compared to other conventional reaction solvents, the 5000-8000 HMF aqueous solutions were used as reaction solvents in the present invention, no salt was added to the graft reaction and the obtained products had significant grafting yield. Specifically, when a molar ratio of the sodium hyaluronate solid to the base catalyst to 2,3-epoxypropyltrimethyl ammonium chloride is 1:1:2, excellent yield and degree of cationization can be achieved.

Sodium hyaluronate can be well dissolved in the 5000-8000 HMNF aqueous solution, and completely dissolved at 65° C., with a solubility being up to 1.0-2.0 g/100 mL. Neither significantly increased viscosity in the solution after the cationic graft reaction in the homogeneous medium, nor coagulation or precipitation during the placement of solution was observed, and the product was stable. It is indicated that 50% and 80% HMF aqueous solutions allow a maximum solubility for the sodium hyaluronate, and cationization of quaternary ammonium salt of high degree can be obtained in such homogeneous system. Local adsorption of hyaluronate solid particles to GTA can be reduced in this system, such that a reaction rate is increased, being conducive to the homogeneous reaction of the hydroxymethyl group on the molecule unit, reducing side reactions of GTA and greatly reducing the usage amount of GTA.

Sodium hyaluronate (HA) and 2,3-epoxypropyltrimethyl-ammonium chloride (GTA) are subjected to a ionized graft reaction in a formamide (HMF) homogeneous aqueous solution, and an alkalescent environment is provided by adding a base catalyst to the system, such that a coupling reaction of GTA and HA is accelerated. The inorganic base catalyst includes NaOH, KOH, $NaCO_3$, $K_2CO_3$, $CH_3COONa$, $CH_3COOK$ and $NaHCO_3$. NaOH is preferred in the practical reaction. Usage amount of NaOH is 0.01, 0.02, 0.04, 0.08, 0.12, 0.14, 0.16, 0.18 mol per average mole number of unit of HA. The pH value during the reaction is adjusted to 7.0-7.5 with the base, while stirring and heating are maintained until the reaction is finished. When the mixture is subjected to cationization wherein HA:GTA=1:2 (molar ratio) and HA:HMF–$H_2O$=1:40 (mass/volume, kg/L), a molar ratio of NaOH is 0.01-0.18 mol/HA, and the reaction temperature is 65° C. At the beginning of the reaction, with the increase of NaOH content in the reaction mixture, reaction rates of both the primary reaction (cationization of HA) and the side reaction of GTA are increased. When the NaOH content in the reaction mixture ranges from 0.02-0.08 mol/HA, there's no side reaction of GTA at the beginning stage, and if the NaOH content is greater than 0.18 mol/HA, both the primary reaction and the side reaction of GTA start from the very first few minutes. In addition, it can be observed from the experimental results that the increase of catalyst usage amount from 0.02 mol/HA to 0.12 mol/HA would make the rate constant of the primary reaction increase by 25 times or more. When the rate constant of the side reaction is observed being increased, the NaOH content is greater than 0.08 mol/HA. When the NaOH content reaches to such level, the primary reaction goes faster than the side reaction. It can be concluded that when the NaOH content in the reaction mixture is 0.08 mol/HA, an optimum use efficiency of GTA can be achieved.

What is claimed is:

1. A preparation and purification method for cationic quaternary ammonium salt of sodium hyaluronate in homogeneous medium, comprising the following steps:
adding a homogeneous solvent and a sodium hyaluronate solid to a vessel, heating the vessel until the contents are dissolved to form a homogeneous system, adding an aqueous solution of 2,3-epoxypropyltrimethylammonium chloride to the homogeneous system, then adding a base catalyst, and stirring at a preset temperature to carry out a graft reaction for obtaining a graft product, wherein the 2,3-epoxypropyltrimethylammonium chloride is grafted to the oxygen atom of the hydroxymethyl group of the sodium hyaluronate,
wherein the homogeneous solvent is a mixture of HMF and $H_2O$ (HMF-$H_2O$).

2. The preparation and purification method for cationic quaternary ammonium salt of sodium hyaluronate in homogeneous medium according to claim 1, wherein a volume fraction of HMF in the HMF-$H_2O$ is 50% to 80% relative to a volume fraction of $H_2O$.

3. The preparation and purification method for cationic quaternary ammonium salt of sodium hyaluronate in homogeneous medium according to claim 1, wherein a molar ratio of an entire molecule of the sodium hyaluronate solid to the 2,3-epoxypropyltrimethylammonium chloride is 1:(0.5-10).

4. The preparation and purification method for cationic quaternary ammonium salt of sodium hyaluronate in homogeneous medium according to claim 1, wherein the preset temperature is 40-80° C., and the graft reaction lasts for at least 0.5 h.

5. The preparation and purification method for cationic quaternary ammonium salt of sodium hyaluronate in homogeneous medium according to claim 1, wherein the base catalyst is at least one of NaOH, KOH, $Na_2CO_3$, $K_2CO_3$, $CH_3COONa$, $CH_3COOK$, $KHCO_3$, and $NaHCO_3$.

6. The preparation and purification method for cationic quaternary ammonium salt of sodium hyaluronate in homogeneous medium according to claim 1, wherein the method further comprising the following steps:
after the graft reaction, subjecting the reaction system to alcohol precipitation to obtain a mixed solution A containing a first precipitate, separating the first precipitate, and sufficiently dissolving the first precipitate with water to obtain a feed liquid;
adding a 1-5 wt % NaCl or KCl aqueous solution to the feed liquid, stirring to allow sufficient dissolution, and adjusting a pH value of the feed liquid to 6.0-7.5;
carrying out a second alcohol precipitation, separating a second precipitate, dissolving the second precipitate with water, and then carrying out alcohol precipitation again to obtain a third precipitate; and
washing the third precipitate with alcohol, dewatering, and drying to obtain a final product.

7. The preparation and purification method for cationic quaternary ammonium salt of sodium hyaluronate in homogeneous medium according to claim 6, wherein during the alcohol precipitation, a volume ratio of the feed liquid to ethanol is 1:(1-10); when water is added to dissolve the first precipitate, a mass-volume ratio of the first precipitate to water is 1:(5-50).

8. The preparation and purification method for cationic quaternary ammonium salt of sodium hyaluronate in homogeneous medium according to claim 1, wherein a molar ratio of the sodium hyaluronate solid to the 2,3-epoxypropyltrimethylammonium chloride is 1:2.

* * * * *